US010786795B2

(12) United States Patent
Boticki et al.

(10) Patent No.: US 10,786,795 B2
(45) Date of Patent: *Sep. 29, 2020

(54) INDIVIDUALIZED FLOW REGULATION SYSTEM AND METHOD

(71) Applicants:John Boticki, Mount Pleasant, WI (US); Jim Bournoville, Racine, WI (US); Paul Larson, Racine, WI (US)

(72) Inventors: John Boticki, Mount Pleasant, WI (US); Jim Bournoville, Racine, WI (US); Paul Larson, Racine, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/556,072

(22) Filed: Nov. 28, 2014

(65) Prior Publication Data

US 2016/0074819 A1 Mar. 17, 2016

Related U.S. Application Data

(60) Provisional application No. 61/910,324, filed on Nov. 30, 2013.

(51) Int. Cl.
*B01F 15/00* (2006.01)
*F16K 31/40* (2006.01)
(Continued)

(52) U.S. Cl.
CPC ...... *B01F 15/00422* (2013.01); *B01F 3/0865* (2013.01); *B01F 5/043* (2013.01);
(Continued)

(58) Field of Classification Search
CPC .............. B01F 15/00422; B01F 15/026; B01F 15/0429; B01F 3/0865; B01F 5/043; F16K 31/404; D06F 39/08
(Continued)

(56) References Cited

U.S. PATENT DOCUMENTS 2,381,589 A * 8/1945 Hayes ................. A01C 23/042
222/129
2,460,407 A * 2/1949 Andrus ................. F16L 55/027
138/43

(Continued)

FOREIGN PATENT DOCUMENTS

WO 20130011487 A1 1/2013

OTHER PUBLICATIONS

Peter's Physics Pages, http://www.insula.com.au:80/physics/1250/poiseuille.html Lat updated on Sep. 2010, Copyright Peter & BJ Eyland as taken from web.archive.org snapshot on Jan. 26, 2013 , https://web.archive.org/web/20130126102719/http://www.insula.com.au:80/physics/1250/poiseuille.html.*

*Primary Examiner* — Tony G Soohoo
(74) *Attorney, Agent, or Firm* — David A. Gottardo, Attorney at Law

(57) ABSTRACT

A liquid dispenser for dispensing an effluent mixture comprises a manifold inlet connectable to a pressurized liquid source, at least one individual diluent outlet in fluid communication with the manifold inlet, and at least one backflow preventer and eductor system in fluid communication with the at least one individual diluent outlet. A flow regulator is in fluid communication with the at least one individual diluent outlet and the at least one backflow preventer and eductor system, located upstream of the at least one backflow preventer and eductor system and downstream of the at least one individual diluent outlet. The flow regulator is preferably individualized for the at least one backflow preventer and eductor system and interchangeable within the dispenser to facilitate a plurality of volumetric flow rates to the at least one respective backflow preventer and eductor system.

22 Claims, 9 Drawing Sheets

(51) Int. Cl.
*B01F 15/04* (2006.01)
*D06F 39/08* (2006.01)
*B01F 5/04* (2006.01)
*B01F 3/08* (2006.01)
*B01F 15/02* (2006.01)

(52) U.S. Cl.
CPC ........ *B01F 15/026* (2013.01); *B01F 15/0429* (2013.01); *D06F 39/08* (2013.01); *F16K 31/404* (2013.01)

(58) Field of Classification Search
USPC .......... 366/163.1, 163.2, 167.1, 173.1, 173.2
See application file for complete search history.

(56) References Cited

U.S. PATENT DOCUMENTS

| | | | | |
|---|---|---|---|---|
| 3,915,187 | A * | 10/1975 | McCalla | C02F 1/686 137/101.27 |
| 3,955,595 | A * | 5/1976 | Modes | G05D 7/014 137/517 |
| 4,311,160 | A * | 1/1982 | Charland | F16K 19/00 137/111 |
| 4,437,493 | A * | 3/1984 | Okuda | G05D 7/0133 137/504 |
| 5,427,151 | A * | 6/1995 | Pauley | B01F 5/0077 137/505.25 |
| 5,518,020 | A * | 5/1996 | Nowicki | A47L 15/4427 137/216 |
| 5,522,419 | A * | 6/1996 | Sand | B01F 5/0413 137/216 |
| 5,927,338 | A * | 7/1999 | Boticki | B01F 5/0413 137/599.12 |
| 6,283,330 | B1 | 9/2001 | Gillespie | |
| 6,517,727 | B2 * | 2/2003 | Pickens | B01F 1/0027 137/14 |
| 6,619,318 | B2 | 9/2003 | Dlhart et al. | |
| 6,634,376 | B2 * | 10/2003 | Haas | F04F 5/10 137/143 |
| 6,783,329 | B2 * | 8/2004 | Vilela | F04F 5/461 137/110 |
| 7,163,617 | B2 * | 1/2007 | Treiman | A61L 2/18 137/1 |
| 8,398,003 | B2 | 3/2013 | Hubmann et al. | |
| 8,813,789 | B2 * | 8/2014 | Dalhart, Sr. | B01F 5/0413 137/613 |
| 2002/0166593 | A1 * | 11/2002 | Oliver | B01F 5/0413 137/893 |
| 2003/0034078 | A1 * | 2/2003 | Haas | F04F 5/10 137/895 |
| 2003/0056841 | A1 | 3/2003 | Dalhart et al. | |
| 2003/0071234 | A1 * | 4/2003 | Weber | F16K 31/404 251/25 |
| 2004/0079411 | A1 * | 4/2004 | Davis | B08B 3/026 137/115.16 |
| 2005/0084414 | A1 | 4/2005 | Treiman | |
| 2007/0028980 | A1 * | 2/2007 | Lohr | B01F 5/0413 137/889 |
| 2009/0090415 | A1 * | 4/2009 | Harris | F16K 27/003 137/7 |
| 2010/0024896 | A1 * | 2/2010 | Dalhart | B01F 5/0413 137/87.04 |
| 2010/0132814 | A1 * | 6/2010 | Schiller | B01F 5/043 137/528 |
| 2010/0314137 | A1 * | 12/2010 | Jackson | A62C 5/02 169/15 |
| 2011/0139284 | A1 * | 6/2011 | Dyer | B01F 5/0413 137/892 |
| 2011/0232774 | A1 | 9/2011 | Lohr et al. | |
| 2012/0325853 | A1 | 12/2012 | Harris et al. | |
| 2014/0158241 | A1 * | 6/2014 | Patreangeli | F16K 15/145 137/843 |
| 2014/0169121 | A1 * | 6/2014 | Petrangeli | B01F 5/0413 366/163.2 |
| 2015/0157992 | A1 * | 6/2015 | Boticki | B01F 3/0865 137/15.09 |

\* cited by examiner

INDIVIDUALIZED FLOW REGULATION SYSTEM AND METHOD

CROSS REFERENCE RELATED TO APPLICATIONS

This application claims priority to U.S. Provisional Application Ser. No. 61/910,324 filed on Nov. 30, 2013.

TECHNICAL FIELD OF THE INVENTION

This invention relates generally to the dispensing of a liquid. More specifically, the invention relates to an apparatus and method for economically and selectively regulating the input volumetric flow rate of liquid to the mixing components of a dispenser through the use of a flow regulator or flow regulator and standpipe assembly located upstream of the dispenser's backflow preventer and eductor system and downstream of any T-connector or actuated valve assembly.

BACKGROUND OF THE INVENTION

The mixing of detergent or other concentrates with a water stream commonly occurs in preparation for cleaning services within a commercial facility. During such mixing, the liquid concentrate is drawn from a source and mixed, via an eductor utilizing Venturi action, with a diluent water stream to form the overall diluted detergent or other effluent mixture. The foregoing mixing function typically occurs within a wall mounted cabinet that houses one or more concentrate sources (i.e., bottles of detergent or other concentrate) and is connected to a water source. A dispensing hose is typically connected to the cabinet for dispensing the water-concentrate mixture effluent into a bucket or other receptacle.

A flow regulator is often utilized with dispensing systems to control or regulate the volumetric flow rate of liquid (i.e., water) from a water source to the dispensing system. This flow regulation allows for a desired volumetric flow rate of water into the dispensing system such that desired dilution rates can be achieved within the system. Prior art, flow-regulated dispensing systems attach such regulators between the water supply and the dispensing system as a whole, generally at the system's inlet manifold.

Numerous disadvantages, however, are associated with such prior art flow-regulated dispensing systems. Because dispensing systems often provide multiple points of use (i.e., multiple dispensing points of various liquid mixtures at various volumetric flow rates), a single flow regulator regulating the volumetric flow of liquid to the entire system proves insufficient when a plurality of volumetric flow rates is called for. Also, typical flow regulators, when installed at the inlet manifold of a dispensing system, are expensive and difficult to access for maintenance and cleaning purposes, and are not interchangeable. Furthermore, flow regulators installed at the inlet manifold of a dispensing system often result in inaccurate dilution ratios for the dispensed effluent liquid. The present invention overcomes the foregoing disadvantages and present numerous other advantages over the prior art systems.

SUMMARY OF THE INVENTION

This invention relates generally to the dispensing of a liquid. More specifically, the invention relates to an apparatus and method for economically and selectively regulating the input volumetric flow rate of liquid to the mixing components of a dispenser through the use of a flow regulator or flow regulator and standpipe assembly located upstream of to the dispenser's backflow preventer and eductor system and downstream of any T-connector or actuated valve assembly.

A liquid dispenser for dispensing at least one effluent mixture comprises a manifold inlet connectable to a pressurized liquid source, at least one individual diluent outlet fluid communication with the manifold inlet, and at least one backflow preventer and eductor system in fluid communication with the at least one individual diluent outlet. The backflow preventer and eductor system defines at least one dispenser outlet for dispensing the at least one effluent mixture white the at least one eductor system defines at least one additive inlet in fluid communication with at least one respective additive source.

A flow regulator is in fluid communication with the at least one individual diluent outlet and the at least one backflow preventer and eductor system. The flow regulator is located upstream of the at least one backflow preventer and eductor system and downstream of the at least one individual diluent outlet. The flow regulator is preferably individualized for the at least one backflow preventer and eductor system and interchangeable within the dispenser to facilitate a plurality of volumetric flow rates to the at least one respective backflow preventer and eductor system.

The flow regulator facilitates a dilution ratio for the at least one backflow preventer and eductor system having an error of between at least about plus 10 percent and at least about minus 10 percent and further facilitates a consistent volumetric flow rate of liquid to the at least one backflow preventer and eductor system through a range of manifold inlet pressures ranging from about 30 p.s.i. to about 90 p.s.i. The at least one individual diluent outlet is defined by an actuated valve or a T-connector. The flow regulator of the dispenser may further comprise a standpipe to define a flow regulator and standpipe assembly, with the flow regulator or flow regulator and standpipe assembly positioned within the dispenser to ensure a laminar fluid flow to the backflow preventer and eductor system.

DESCRIPTION OF THE EMBODIMENTS

Figure 1:
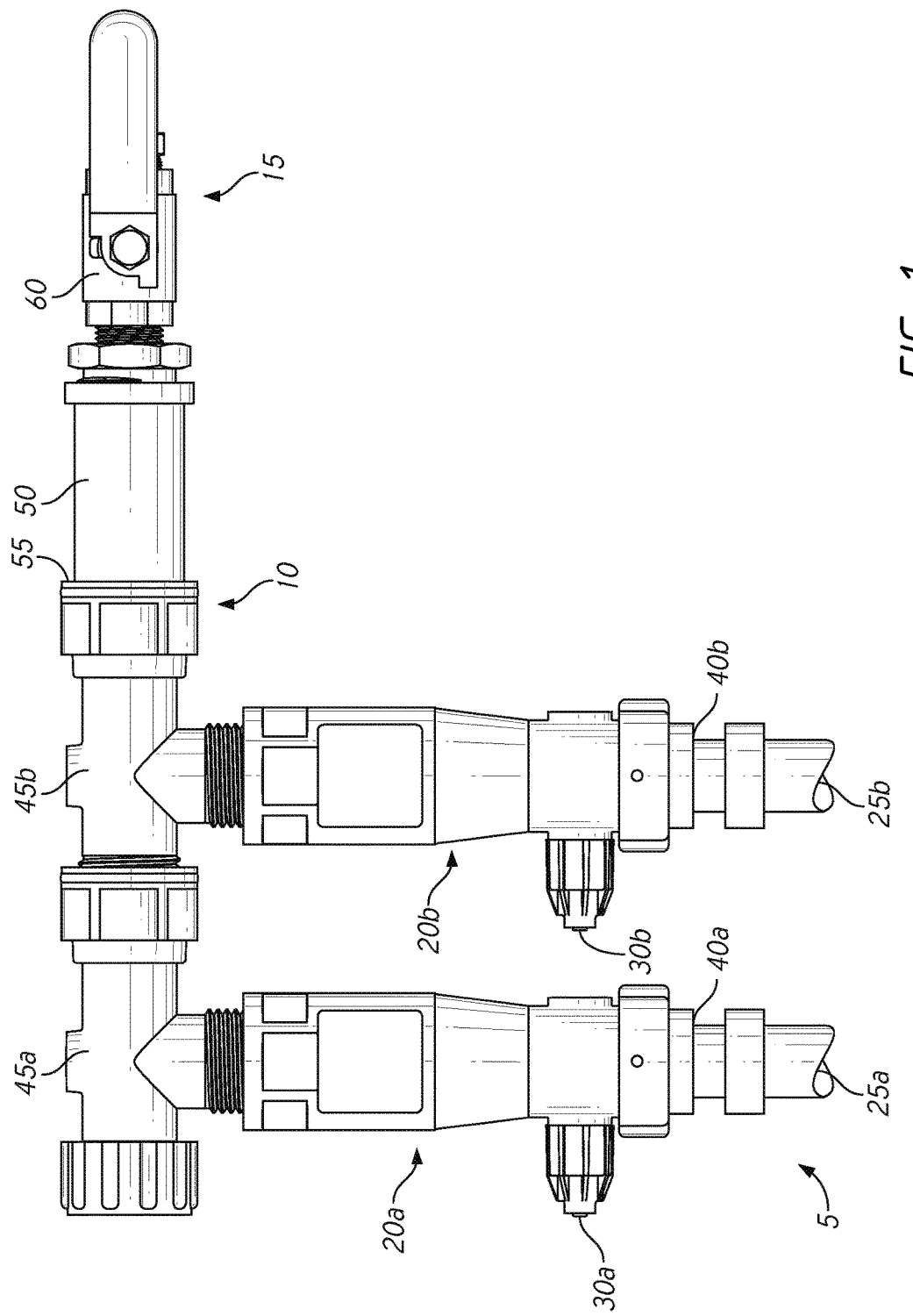
FIG. 1 is a front elevation view of an embodiment of a prior at flow-regulated dispenser.

This invention relates generally to the dispensing of a liquid. More specifically, this invention relates to an apparatus and method for economically and selectively regulating the input volumetric flow rate of liquid to the mixing components of a dispenser through the use of a flow regulator or flow regulator and standpipe assembly located upstream of the dispenser's backflow preventer and eductor system. FIG. 1 illustrates an embodiment of a prior art, flow-regulated dispensing system 5. The liquid dispensing system 5 for dispensing an effluent mixture comprises a manifold inlet 10 connected to a pressurized liquid source 15, and first and second backflow preventer and eductor systems 20a and 20b in fluid communication with the manifold inlet and defining first and second discharge outlets 25a and 25b for dispensing the respective effluent mixtures. The system further defines respective additive first and second inlets 30a and 30b in fluid communication with respective additive sources (not shown).

As illustrated in FIG. 1, the first and second backflow preventer and eductor systems 20a and 20b in fluid communication with the manifold inlet 10 define respective first and second eductor outlets 40a and 40b. The eductors are located downstream from the manifold inlet and are preferably in parallel flow relation with one another. In the embodiment illustrated in FIG. 1, the first and second backflow preventer and eductor systems 20a and 20b are connected to the manifold inlet 10 in parallel relation to one another via respective first and second piping "T-connectors" 45a and 45b. In the embodiment of FIG. 1, the prior art flow regulator 50 is located at the manifold inlet 10, proximal to the first T-connector's inlet 55 while a common ball valve 60 is located between the flow regulator 50 and the liquid source 15 such that the flow of diluent to the dispenser may be turned on and off. As is apparent in FIG. 1, while the flow regulator 50 can regulate the volumetric flow rate of liquid into the entire system 5 by simultaneously regulating the flow rate entering both backflow preventer and eductor systems 20a and 20b, the regulator cannot regulate the flow rate to each eductor system individually. Also, such flow regulators are generally "semi-permanent," expensive brass fittings that require the services of a plumber to clean and maintain.

Figure 2:
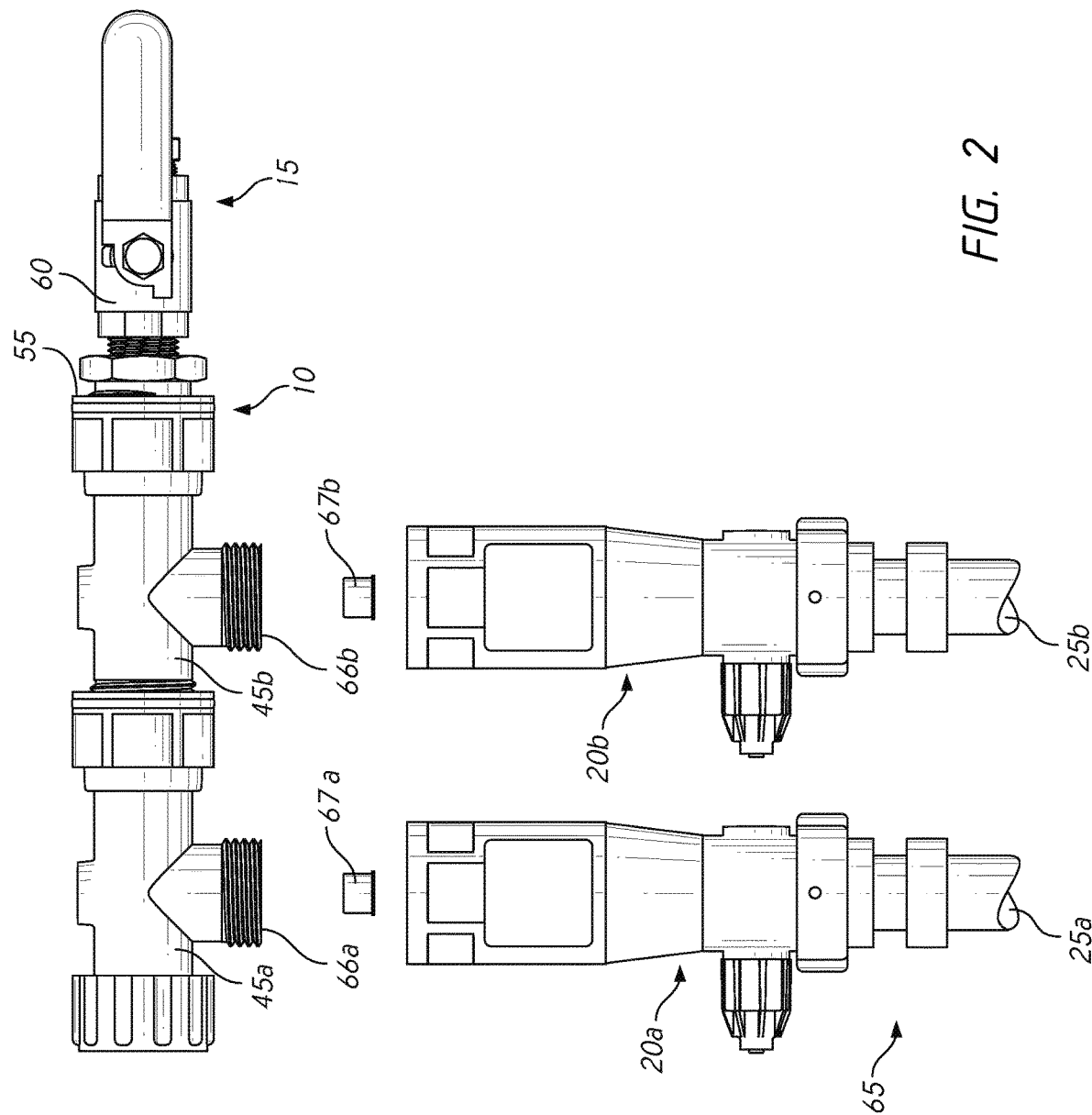
FIG. 2 is a front elevation assembly view of an embodiment of the dispenser utilizing at least one flow regulator.

FIG. 2 thus illustrates, in partial disassembly, an embodiment of the present system 65. As illustrated therein, the liquid dispensing system 65 for dispensing an effluent mixture again comprises a manifold inlet 10, in fluid communication with the pressurized liquid source 15 The dispenser further comprises at least one individual diluent outlet 66 (i.e., individual diluent outlets 66a and 66b) fluid communication with the manifold inlet 10, and at least one backflow preventer and eductor system 20 (i.e., backflow preventer and eductor systems 20a and 2b) fluid communication with the at least one individual diluent outlet.

For the sake of illustration, two backflow preventer and eductor systems 20a and 20b are illustrated. However, it is understood that only one backflow preventer and eductor system or any plurality of such systems could be utilized as well. Referring again to FIG. 2, the first and second backflow preventer and eductor systems 20a and 20b are in respective fluid communication with first and second individual diluent outlets 66a and 66b (defined by respective T-connectors 45a and 45b) located downstream from the manifold inlet 10 and upstream of the systems. The backflow preventer and eductor systems further define first and second discharge outlets 25a and 25b for dispensing the respective effluent mixtures. In the embodiment illustrated of FIG. 2, the first and second backflow preventer and eductor systems 20a and 20b are again connected to the inlet 10 in parallel relation to one another via respective first and second piping "T-connectors" 45a and 45b. However, the prior art flow regulator 50 is not located between the first T-connector's inlet 55 and ball valve 60 (i.e., at the manifold inlet 10).

Instead, a flow regulator 67 flow regulators 67a and 67b) is in fluid communication with the at least one individual diluent outlet 66 and the at least one backflow preventer and eductor system 20. The flow regulator is located upstream of the at least one backflow preventer and eductor system and downstream of the at least one individual diluent outlet. As illustrated in FIG. 2, first and second flow regulators 67a and 67b are respectively located between the individual diluent outlets 66a and 66b and the respective first and second backflow preventer and eductor systems 20a and 20b, upstream of the eductor systems and downstream of the outlets.

In the embodiment of FIG. 2, the respective flow regulators 67a and 67b are located between or within the threaded couplings of the respective first and second T-connectors 45a and 45b and first and second backflow preventer and eductor systems 20a and 20b, with no additional components separating the individual diluent outlets 66a and 66b of the T-connectors from the eductor systems. However, it is understood that additional components may be connected between the T-connectors and eductor systems, such as "quick disconnect" components and/or linking pipe sections (not shown). Nonetheless, for embodiments utilizing such additional components, the flow regulators 67a and 67b are again located upstream of the eductor systems 20a and 20b and downstream of the individual diluent outlets 66a and 66b, within or between such components.

Referring again to FIG. 2, it is noted that the respective flow regulators 67a and 67b are individualized for each respective backflow preventer and eductor system 20a and 20b. Thus, if the eductor system requires a specific volumetric flow rate of incoming liquid for creating a desired effluent mixture of the dispensing system, a flow regulator having that volumetric flow rate specification is utilized. Thus, a flow regulator in fluid communication with a given eductor system within the dispenser may have a higher, equal, or lower volumetric flow rate than one or more other regulators in respective fluid communication with the dispenser's one or more other respective eductor systems, depending upon the regulators utilized. The flow regulator's location above the backflow preventer and eductor also maintains the desired laminar flow properties, to be further discussed, necessary to preserve the consistent vacuum of the eductors' respective Venturi nozzles and thus produce accurate and consistent dilution rates. It is further noted that the backflow preventer and eductor systems 20a and 20b of FIG. 2 associated with the flow regulators 67a and 67b may comprise air gap eductors, safe gap eductors, or any other backflow preventing eductor known in the art.

With further regard to individualizing the flow regulators 67a and 67b of FIG. 2 for the respective backflow preventer and eductors 20a and 20b, the flow regulators are interchangeable within the system. Thus, if it is desired to change the volumetric flow rate of liquid leading to a given backflow preventer and eductor system, a user of the system merely unscrews the backflow preventer and eductor system from the T-connector, removes the existing flow regulator from there-between, and replaces it with another flow regulator having the desired volumetric flow rate specification. The user thereafter screws the backflow preventer and eductor system to the T-connector to resume dispensing operations.

Figure 3:
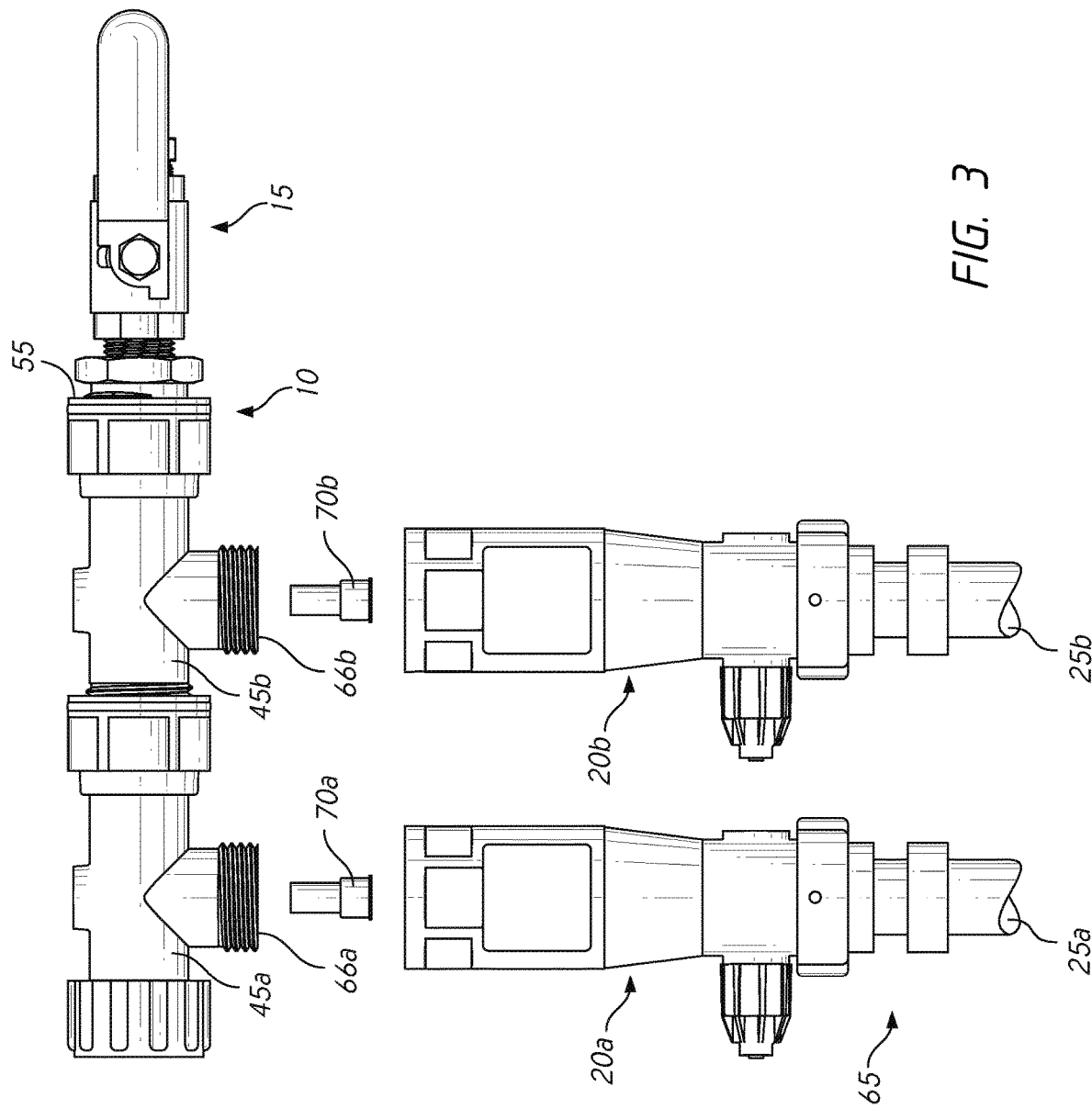
FIG. 3 is a front elevation assembly view of an embodiment of the dispenser utilizing at least one flow regulator and standpipe assembly.

FIG. 3 illustrates an alternate embodiment of the liquid dispensing system 65 for dispensing an effluent mixture again comprising a manifold inlet 10, in fluid communication with the pressurized liquid source 15. The dispenser again further comprises at least one individual diluent outlet 66 individual diluent outlets 66a and 66b) in fluid communication with the manifold inlet 10, and at least one backflow preventer and eductor system 20 (i.e., backflow preventer and eductor systems 20a and 2b) in fluid communication with the at least one individual diluent outlet.

A flow regulator and standpipe assembly 70 (i.e., flow regulator and standpipe assemblies 70a and 70b) is in fluid communication with the at least one individual diluent outlet 66 and the at least one backflow preventer and eductor system 20. The flow regulator and standpipe assembly is located upstream of the at least one backflow preventer and eductor system and downstream of the at least one individual diluent outlet. As illustrated in FIG. 3, first and second flow regulator and standpipes assemblies 70a and 70b are respectively located between the diluent outlets 66a and 66b and the first and second backflow preventer and eductor systems 20a and 20b, upstream of the eductor systems and downstream of the outlets.

In the embodiment of FIG. 3, the respective flow regulator and standpipe assemblies 70a and 70b are located between respective first and second T-connectors 45a and 45b and first and second backflow preventer and eductor systems 20a and 20b, with no additional components separating individual diluent outlets 66a and 66b of the T-connectors from the eductor systems. However, it is understood that additional components may be connected between the connectors and eductor systems, such as "quick disconnect" components and/or linking pipe sections (not shown). Nonetheless, for embodiments utilizing such additional components, the flow regulator and standpipe assemblies 70a and 70b are again located upstream of the eductor systems 20a and 20b and downstream of the individual diluent outlets 66a and 66b within or between such components.

Referring again to FIG. 3, it is noted that the respective flow regulator and standpipe assemblies 70a and 70b are individualized for each respective eductor system 20a and 20b. Again, if the eductor system requires a specific volumetric flow rate of incoming liquid for creating a desired effluent mixture of the dispensing system, a flow regulator and standpipe assembly having that volumetric flow rate specification is utilized, Thus, a flow regulator and standpipe assembly in fluid communication with a given eductor system within the dispenser may have a higher, equal, or lower volumetric flow rate than one or more other flow regulator and standpipe assemblies in respective fluid communication with the dispenser's one or more other respective eductor systems, depending upon the assemblies utilized. The flow regulator and standpipe assemblies also maintain the desired laminar flow properties, to be further discussed, necessary to preserve the consistent vacuum of the eductors' respective Venturi nozzles and thus produce accurate and consistent dilution rates. It is further noted that the backflow preventer and eductor systems 20a and 20b of FIG. 3 may comprise air gap eductors, safe gap eductors, or any other backflow preventing eductor known in the art.

With further regard to individualizing the flow regulator and standpipe assemblies 70a and 70b of FIG. 3 for the respective backflow preventer and eductors 20a and 20b, the assemblies are interchangeable within the system. Thus, if it is desired to change the volumetric flow rate of liquid leading to a given backflow preventer and eductor system, a user of the system merely unscrews the backflow preventer and eductor system from the T-connector, remove the existing flow regulator and standpipe assembly from there-between, and replaces it with another flow regulator and standpipe assembly having the desired volumetric flow rate specification. The user thereafter screws the backflow preventer and eductor system to the T-connector to resume dispensing operations.

Figure 4:
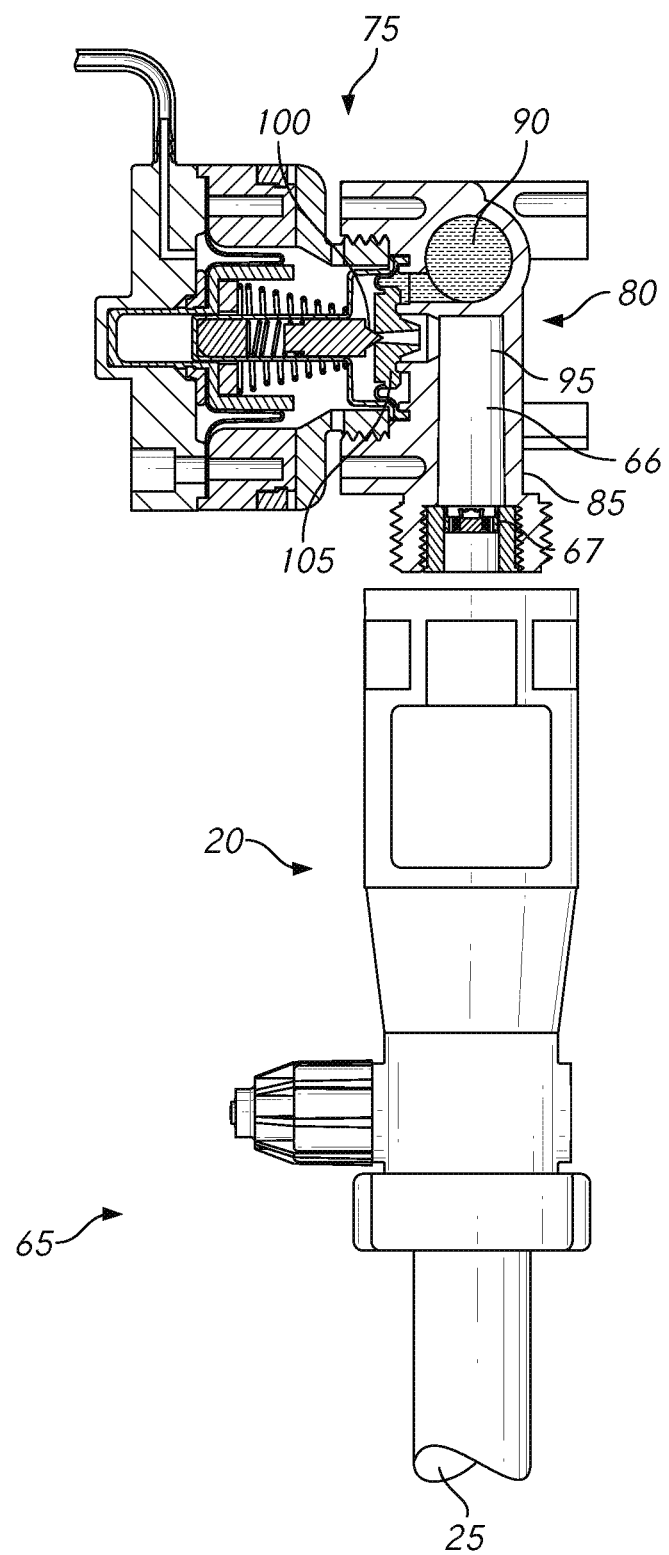
FIG. 4 is a partial section and assembly view of a flow regulator used in association with an actuated valve assembly.

FIG. 4 illustrates, in partial disassembly and section, an alternate embodiment of the present invention 65. More specifically, FIG. 4 illustrates a remotely or locally actuated valve system 75, such as that described in U.S. patent application Ser. No. 13/921,783 and incorporated by reference herein, utilized up stream of the at least one back flow preventer and eductor system 20. The valve assembly 80 of the actuated system 75 preferably comprises a valve manifold 85 defining fluid inlet and outlet channels 90 and 95 separated by an armature seat 100 and valve seal seat 105. In this embodiment, the valve's outlet channel 95 preferably defines the individual diluent outlet 66. The fluid inlet channel of the valve assembly is in fluid communication with the fluid source 15, such as a water spigot, while the diluent outlet 66 (i.e., outlet channel 95) is in fluid communication with the backflow preventer and eductor system 20 and discharge outlet 25.

As further illustrated in FIG. 4, the flow regulator 67 is located between the individual diluent outlet 66 and backflow preventer and eductor system 20 (i.e., within the valve assembly's outlet channel 95, upstream of the system). It is noted that although FIG. 4 illustrates a single diluent outlet 66, defined by the actuated valve system 75, and backflow preventer and eductor system 20 having the flow regulator 67 there-between, additional such combinations may be present (i.e., as illustrated in the parallel systems of FIGS. 1 and 2), with the respective flow regulators again individualized for each respective eductor system. Again, if the eductor system requires a specific volumetric flow rate of incoming liquid for creating a desired effluent mixture of the dispensing system, the flow regulator 67 is individualized such that a flow regulator having that volumetric flow rate specification is utilized.

Thus, a flow regulator in fluid communication with a given eductor system within the dispenser may have a higher, equal, or lower volumetric flow rate than one or more other flow regulators in respective fluid communication with the dispenser's one or more other respective eductor systems, depending upon the assemblies utilized. It is further noted that the backflow preventer and eductor system 20 of FIG. 4 may comprise an air gap eductor, safe gap eductor, or any other backflow preventing eductor known in the art.

With further regard to individualizing the flow regulator 67 of FIG. 4 for the backflow preventer and eductor system 20, the regulator is interchangeable within the system. Thus, if it is desired to change the volumetric flow rate of liquid leading to the given backflow preventer and eductor system, a user of the system merely unscrews the backflow preventer and eductor system from the valve assembly, removes the existing flow regulator from there-between, and replaces it with another flow regulator having the desired volumetric flow rate specification. The user thereafter screws the backflow preventer and eductor system to the valve assembly to resume dispensing operations.

In the embodiment of FIG. 4, the flow regulator 67 is located between the individual diluent outlet 66 and backflow preventer and eductor system 20, with no additional components separating the valve assembly 80 from the eductor system. However, it is understood that additional components may be connected between the assembly 80 and eductor system 20, such as a "quick disconnect" component and/or linking pipe section. Nonetheless, for embodiments utilizing such additional components, the flow regulator 67 is again located between the individual diluent outlet 66 and eductor system 20 within or between the components and/or valve assembly 80 or eductor system, upstream of the eductor system.

Figure 5:
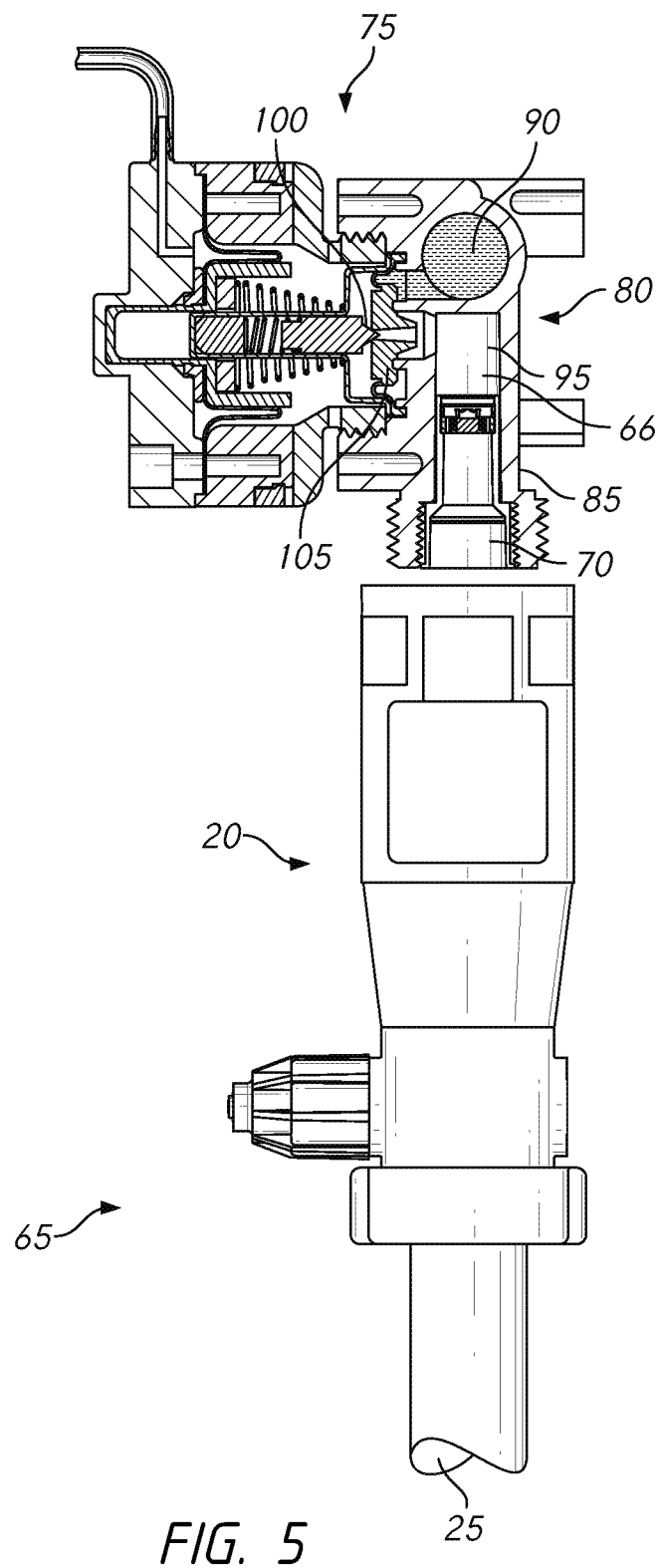
FIG. 5 is a partial section and assembly view of a flow regulator and standpipe assembly used in association with an actuated valve assembly.

FIG. 5 illustrates, in partial disassembly and section, another embodiment of the present invention 65. More specifically, FIG. 5 illustrates a remotely or locally actuated valve system 75, such as that described in U.S. patent application Ser. No. 13/921,783 and incorporated by reference herein, utilized up stream of the at least one back flow preventer and eductor system 20. The valve assembly 80 of the actuated system 75 preferably comprises a valve manifold 85 defining fluid inlet and outlet channels 90 and 95 separated by an armature seat 100 and valve seal seat 105. Again, for this embodiment, the valve's outlet channel 95 preferably defines the individual diluent outlet 66. The fluid inlet channel of the valve assembly is in fluid communication with the fluid source 15, such as a water spigot, while the diluent outlet 66 (i.e., outlet channel 95) is in fluid communication with the backflow preventer and eductor system 20 and discharge outlet 25.

As further illustrated in FIG. 5, the flow regulator and standpipe assembly 70 is located between the individual diluent outlet 66 and backflow preventer and eductor system 20 (i.e., within the valve assembly's outlet channel 95, upstream of system). It is noted that although FIG. 5 illustrates a single diluent outlet 66, defined by the actuated valve system 75, and backflow preventer and eductor system 20 system having the flow regulator and standpipe assembly 70 there-between, additional such combinations may be present (i.e., as illustrated in the parallel systems of FIGS. 1 and 2), with the respective flow regulator and standpipe assemblies again individualized for each respective eductor system. Again, if the eductor system requires a specific volumetric flow rate of incoming liquid for creating a desired effluent mixture of the dispensing system, a flow regulator and standpipe assembly 70 is individualized such that a flow regulator and standpipe assembly having that volumetric flow rate specification is utilized.

Thus, a flow regulator and standpipe assembly in fluid communication with a given eductor system within the dispenser may have a higher, equal, or lower volumetric flow rate than one or more other flow regulator and standpipe assemblies in respective fluid communication with the dispenser's one or lore other respective eductor systems, depending upon the assemblies utilized. The flow regulator and standpipe assemblies may also maintain the desired laminar flow properties, to be further discussed, necessary to preserve the consistent vacuum of the eductors' respective Venturi nozzles and thus produce accurate and consistent dilution rates. It is further noted that the backflow preventer and eductor system 20 of FIG. 5 may comprise an air gap eductor, safe gap eductor, or any other backflow preventing eductor known in the art.

With further regard to individualizing the flow regulator and standpipe assembly 70 of FIG. 5 for the backflow preventer and eductor system 20, the regulator is interchangeable within the system. Thus, if it is desired to change the volumetric flow a e of liquid leading to the given backflow preventer and eductor system, a user of the system merely unscrews the backflow preventer and eductor system from the valve assembly, removes the existing flow regulator from there-between, and replaces it with another flow regulator and standpipe assembly having the desired volumetric flow rate specification. The user thereafter screws the backflow preventer and eductor system to the valve assembly to resume dispensing operations.

In the embodiment of FIG. 5, the flow regulator and standpipe assembly 70 is located between individual diluent outlet 66 defined by the valve assembly and backflow preventer and eductor system 20, with no additional components separating the valve assembly from the eductor system. However, it is understood that additional components may be connected between the assembly and eductor system, such as a "quick disconnect" component and/or linking pipe section. Nonetheless, for embodiments utilizing such additional components, the flow regulator and standpipe assembly is again located between the individual diluent outlet and eductor system within or between the components and/or valve assembly or eductor system, upstream of the eductor system.

Figure 6:
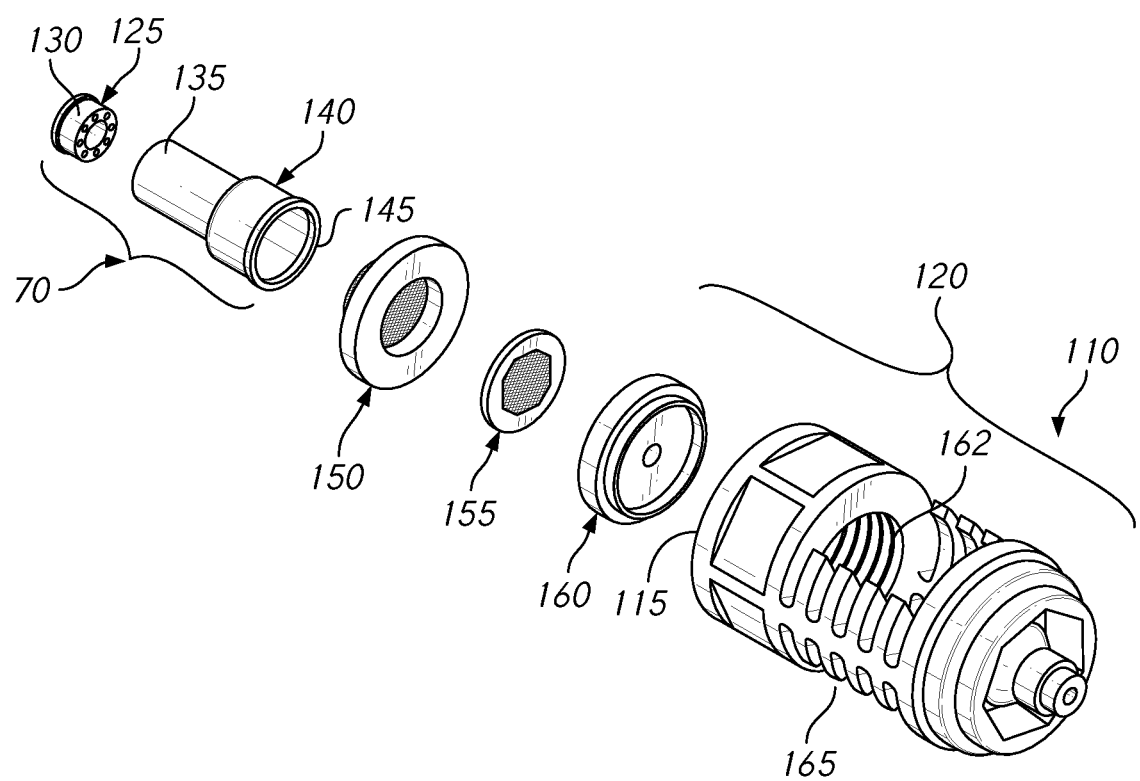
FIG. 6 is a perspective assembly view of a flow regulator and standpipe assembly used in association with an air gap eductor.
Figure 7:
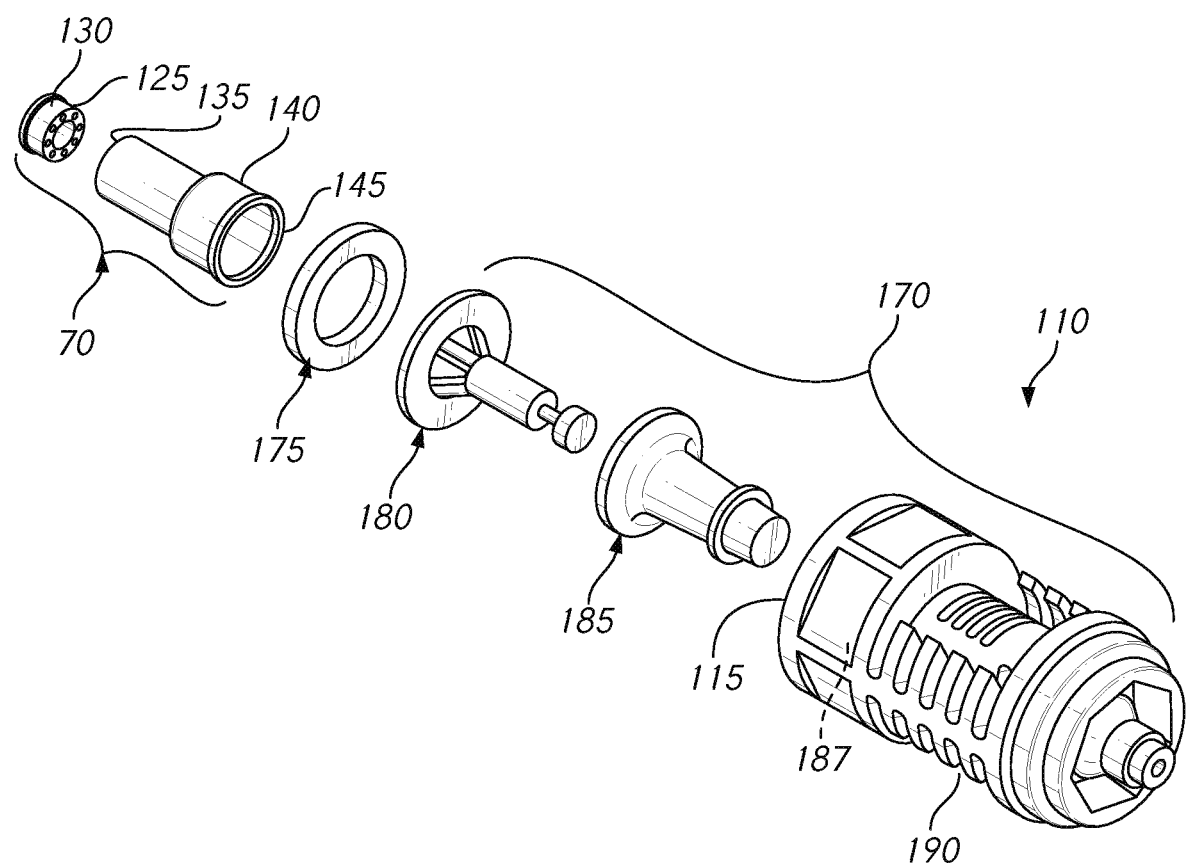
FIG. 7 is a perspective assembly view of a flow regulator and standpipe assembly used in association with a safe gap eductor.

FIGS. 6 and 7 illustrate detailed assembly views of one embodiment of the flow regulator and standpipe assembly 70 in relation to its respective proximal downstream backflow preventers 110 of the backflow preventer and eductor assemblies 120, regardless of whether the foregoing T-connectors 45 or actuated valve systems 75 lie upstream of the respective flow regulators and standpipe assemblies 70 to define the individual diluent outlets 66. It is noted that the inlet 115 of the backflow preventers illustrated in FIGS. 6 and 7 (i.e., the air gap and safe gap bodies of the respective air gap and safe gap eductors illustrated therein) have internal threads for threaded connection to either of the foregoing T-connector of actuated valve assembly outlets.

FIG. 6 thus illustrates a flow regulator and standpipe assembly 70 in relation to the components of an air gap backflow preventer. The flow regulator and standpipe assembly 70 is comprised of a flow regulator 125, disk-like in shape and permeated to create a specific flow rate of liquid there-through. The outer periphery 130 of the flow regulator is preferably sized for insertion into the entry end 135 of the standpipe 140 of predetermined length and configuration, to be further discussed, such that the flow regulator 125 and standpipe 140 are in fluid communication with one another. The exit end 145 of the standpipe 140, located downstream of its entry end 135, is in fluid communication with and abuts a filter screen and washer assembly 150. The filter screen and washer assembly 150 is in fluid communication with and abuts a laminar flow disc 155 which, in turn, is in fluid communication and abuts atop nozzle supply 160. The top nozzle supply 160 abuts an internal seat 162 of the air gap body 165 of the air gap back flow preventer. Referring to FIGS. 3, 5 and 6, internal threads of the air gap body 154 engage external threads of the T-connector 45 (FIG. 3) or valve assembly 80 (FIG. 5) to secure (i.e. thread) the air gap body 165 to either the T-connector or valve assembly.

FIG. 7 illustrates a flow regulator and standpipe assembly 70 in relation to the components of a safe gap backflow preventer. The flow regulator and standpipe assembly 70 is again comprised of a flow regulator 125, disk-like in shape and permeated to create a specific flow rate of liquid there-through. The outer periphery 130 of the flow regulator is again preferably sized for insertion into the entry end 135 of the standpipe 140 of predetermined length and configuration, to be further discussed, such that the flow regulator 125 and standpipe 140 are in fluid communication with one another. The exit end 145 of the standpipe 140, located downstream of its entry end 135, is in fluid communication with and abuts a flexible washer 175. The washer 175 is in fluid communication with and abuts a safe gap valve retainer 180, which, in turn, is in fluid communication with and abuts a safe gap rubber valve 185. The safe gap rubber valve 185 abuts an internal seat 187 of the safe gap body 190 of the safe gap backflow preventer. Referring to FIGS. 3, 5 and 7, internal threads of the safe gap body 190 engage external threads of the T-connector 45 (FIG. 3) or valve assembly 80 (FIG. 5) to secure (i.e. thread) the safe gap body 190 to either the T-connector or valve assembly.

Figure 8:
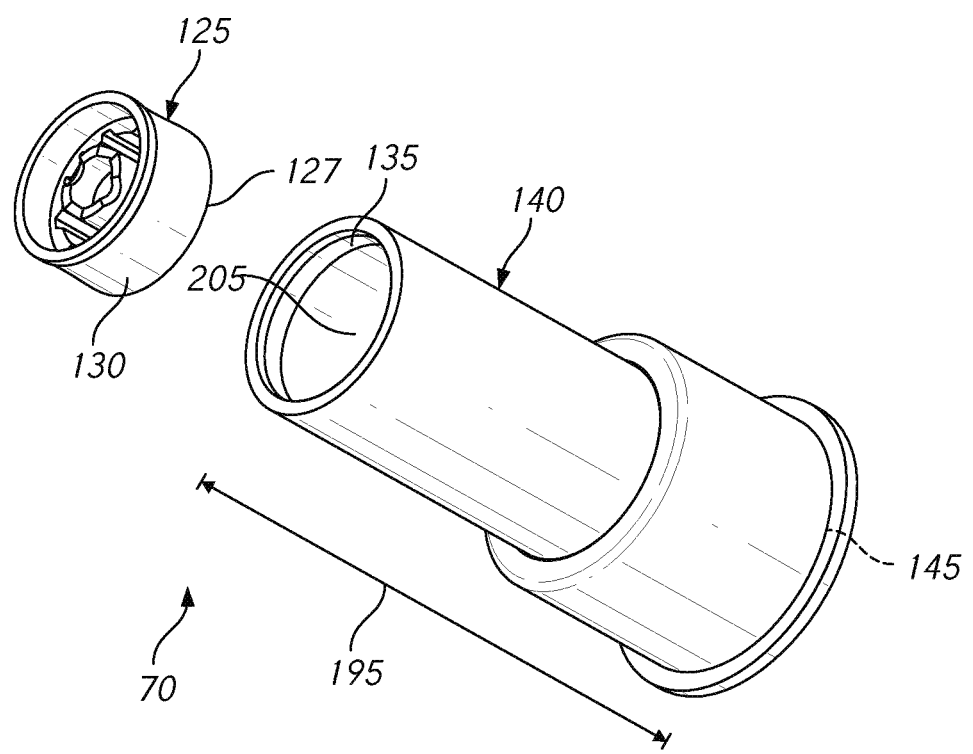
FIG. 8 is a perspective assembly view of one embodiment of the flow regulator and standpipe assembly.

FIG. 8 illustrates a perspective assembly view of the embodiment of the flow regulator and standpipe assembly 70 illustrated in FIGS. 3, 5, 6 and 7. The flow regulator 125, defining an exit 127, is disk-like in shape and permeated to create a specific flow rate of liquid there-through via a restriction of the liquid's volumetric flow. In various embodiments of the present invention, volumetric flow rates of water through the regulator include 1.4 gallons per minute (g.p.m.) and 3.4 gallons per minute (g.p.m.), as those flow rates are generally desired through the backflow preventing eductor systems of a liquid dispensing system. However, it is understood that regulators specifying any volumetric flow rate can be utilized therein.

The outer periphery 130 of the flow regulator 125 is sized for insertion into the entry end 135 of the standpipe 140 of predetermined length and cross sectional area configuration. The predetermined length 195 of the standpipe 140 existing between its entry 135 and exit 145 preferably ensures flow relaminarization between the flow regulator and downstream backflow preventer and eductor system. For embodiments utilizing an air gap eductor 37 as the backflow preventer and eductor system, it is advantageous to maintain a laminar flow of liquid into the eductor to ensure a consistent vacuum of additive into the Venturi portion of the eductor. This is because a consistent vacuum of additive into the eductor results in accurate and consistent dilution rates of the dispenser. However, a flow regulator, in controlling volumetric flow rates, generally disrupts the flow of liquid there-through to create a non-laminar liquid low immediately downstream of the regulator itself. With increased distance of downstream flow from the regulator, the liquid again attains the desired laminar flow.

Thus, the predetermined length 195 of the standpipe thus defines a distance between the exit 127 of the flow regulator and the exit 145 of the standpipe to ensure a laminar flow of liquid into the eductor. This is especially true for a flow regulator located between a valve assembly and air gap eductor without having any other components (i.e., "quick disconnect" and/or pipe segments) located there-between. The standpipe of the flow regulator and standpipe assembly 70 defines the foregoing predetermined distance between the flow regulator exit and air gap eductor entrance to ensure a laminar liquid flow to the eductor. With the exit of the standpipe located proximal to the entry of the air gap eductor, the standpipe defines a length between the flow regulator exit 127 and standpipe exit 145 of between about 0 inches and about 1.5 inches long; preferably between about 0.5 inches and about 1.0 inch long; and optimally about 0.9 inches long.

Figure 9:
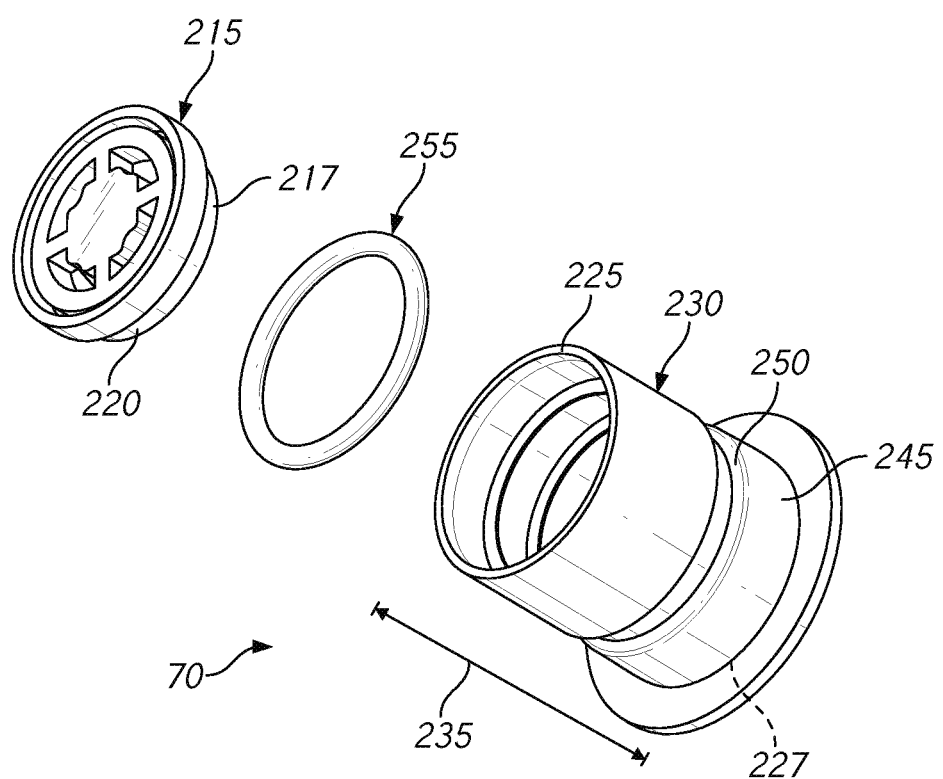
FIG. 9 is a perspective assembly view of an alternate embodiment of the flow regulator and standpipe assembly.

FIG. 9 illustrates a perspective assembly view of another embodiment of the flow regulator and standpipe assembly 70. The flow regulator 215, defining an exit 217, is again disk-like in shape and permeated to create a specific flow rate of liquid via a restriction of the liquid's volumetric flow. In various embodiments of the present invention, volumetric flow rates of water through the regulator include 1.4 gallons per minute (g.p.m.) and 3.4 gallons per minute (g.p.m.), as those flow rates generally desired through the backflow preventing eductor systems of a liquid dispensing system. However, it is understood that regulators specifying any volumetric flow rate can be utilized therein.

The outer periphery 220 of the flow regulator 215 is again sized for insertion into the entry end 225 of a standpipe 230 of predetermined length 235. The predetermined length 235 of the standpipe 230 existing between its entry 225 and exit 227 preferably ensures flow relaminarization between the flow regulator and downstream backflow preventer and eductor system. The outer periphery 245 of the standpipe defines a peripheral groove 250 to accept a placement of O-ring 255 therein. The O-ring 255 creates a seal around the standpipe 230 when utilized within the dispenser to prevent any bypass of liquid around the standpipe and ensure the flow of liquid through the regulator 215.

The predetermined length 195 of the standpipe 230 again ensures flow relaminarization between the flow regulator and backflow preventer and eductor system by defining a distance between the exit 217 of the flow regulator and the exit 227 of the standpipe to ensure a laminar flow of liquid into the eductor. The standpipe 230 defines a length between the flow regulator exit 217 and standpipe exit 227 of between about 0 inches and about 1.5 inches long; preferably between about 0.25 inches and about 0.75 inches long; and optimally about 0.5 inches long.

The foregoing standpipe dimensions recited in relation to FIGS. 8 and 9, when utilized with a flow regulator facilitating a volumetric flow rate of 1.4 g.p.m. of liquid to an air gap eductor, facilitates a dilution ratio of the eductor having an error of at least about plus or minus 10 percent for liquid inlet pressures ranging from about 30 p.s.i. to about 90 p.s.i. This small error deviation thus ensures that effluent liquids, having accurate amounts of additive therein, are produced by the dispenser. White the foregoing small error deviation is achieved via standpipes defining the predetermined distance of the regulator from the backflow preventer and eductor systems, it is understood that the same predetermined distances could be defined by locating the flow regulator between the individual diluent outlet and backflow preventer and eductor system without the use of standpipes. For example, referring again to FIG. 4, the flow regulator can be secured within the valve assembly's outlet channel 95, upstream of the backflow preventer and eductor system by the predetermined distance, via the use of one or more flanges (not shown) defined within the interior surface of the outlet channel.

In use in an embodiment of the dispenser not utilizing at least one actuated valve system, the threaded inlet of the dispenser's manifold is connected to an inlet manifold valve and a liquid (i.e., water) source while the additive inlet is connected to a source of additive, such as a bag, jug or other container. The manifold inlet valve, in fluid communication with the liquid source, is opened to allow a flow of liquid through at least one individual diluent outlet in fluid communication with the manifold inlet valve. The liquid is also allowed to flow through a flow regulator located downstream of the at least one diluent outlet and in fluid communication with the at least one diluent outlet, and into a backflow preventer and eductor system located downstream of the flow regulator and in fluid communication with both the flow regulator and the additive source. The flow regulator ensures a laminar flow of liquid to the respective backflow preventer and eductor systems.

Within the backflow preventer and eductor system, the flow is then forced through the respective inlet nozzles of the safe or air gaps and through the safe or air gaps to the safe or air gap outlets. Upon entering the respective safe or air gap outlets, the water is constricted within the respective nozzles and thereafter expanded within the respective venturi chambers of the eductors. The at least one backflow preventer and eductor system mixes the liquid with the additive drawn from the additive source to create the effluent. In doing so, the controlled flow resulting from the regulator results in a consistent vacuum that thereafter draws the additive, at an accurate and consistent flow rate, into the additive inlet located on one or more of the eductors where the additive is mixed with the diluent and dispensed through the respective eductor's exit orifices. The effluent is thereafter allowed from the dispenser and the manifold inlet valve is thereafter closed to prohibit the flow of liquid and effluent respectively into and out of the dispenser. In this embodiment not having an actuated valve system, the at least one diluent outlet is defined by a T-connector such that the regulator is located downstream from the at least one diluent outlet and upstream from the at least one backflow preventer and eductor system.

The flow regulator is individualized with the backflow preventer and eductor system located downstream of the regulator to ensure that a flow regulator of given volumetric flow rate is utilized to meet the desired flow rate specifications of the backflow preventer and eductor system. To facilitate such individualization, the flow regulator may be changed while the manifold inlet valve is in a closed position. In changing the flow regulator, the at least one backflow preventer and eductor system is unscrewed from the at leas one T-connector, the existing flow regulator is removed from therein, and the new flow regulator is placed therein. The at least one backflow preventer and eductor system is thereafter again screwed to the least one T-connector.

In use in an embodiment of the dispenser utilizing at least one actuated valve system, the threaded inlet of the dispenser's manifold is connected to an inlet manifold valve and a liquid (i.e., water) source while the additive inlet is connected to a source of additive, such as a bag, jug or other container. The manifold inlet valve, in fluid communication with the liquid source, is opened. The at least one actuated valve system of the dispenser, in fluid communication with the liquid source, is actuated to allow a flow of liquid through the individual diluent outlet of the at least one valve and through a flow regulator located downstream of the at least one valve system and in fluid communication with the at least one valve system. The flow regulator ensures a laminar flow of liquid to the respective backflow preventer and eductor systems.

The liquid is thus allowed to flow into a backflow preventer and eductor system located downstream of the flow regulator and in fluid communication with both the flow regulator and an additive source such that the system mixes the liquid with an additive drawn from the source to create the effluent. Within the backflow preventer and eductor system, the flow is then forced through the respective inlet nozzles of the safe or air gaps and through the safe or air gaps to the safe or air gap outlets. Upon entering the respective safe or air gap outlets, the water is constricted within the respective nozzles and thereafter expanded within the respective venturi chambers of the eductors. The at least one backflow preventer and eductor system mixes the liquid with the additive drawn from the additive source to create the effluent. In doing so, the controlled flow of the flow regulator results in a consistent vacuum that thereafter draws the additive, at an accurate and consistent flow rate, into the additive inlet located on one or more of the eductors where the additive is mixed with the diluent and dispensed through the respective eductor's exit orifices. The effluent is thereafter allowed from the dispenser and the at least one actuated valve system is thereafter de-actuated to prohibit the flow of liquid and effluent respectively into and out of the dispenser.

The flow regulator is individualized with the backflow preventer and eductor system located downstream of the regulator to ensure that a flow regulator of given volumetric flow rate is utilized to meet the desired flow rate specifications of the backflow preventer and eductor system. To facilitate such individualization, the flow regulator is changed while the at least one actuated valve system is in a de-actuated state. In changing the flow regulator, the at least one backflow preventer and eductor system is unscrewed from the at least one actuated valve system, the existing flow regulator is removed from therein, and the new flow regulator is placed therein. The at least one backflow preventer and eductor system is thereafter again screwed to the least one actuated valve system. It is noted that, in each of the foregoing uses, a standpipe could be utilized in addition to the backflow preventer to comprise a backflow preventer and standpipe assembly, with the assembly facilitating a laminar flow of liquid to the at least one backflow preventer and eductor system.

While this foregoing description and accompanying figures are illustrative of the present invention, other variations in structure and method are possible without departing from the invention's spirit and scope.

We claim:

1. A liquid dispenser for dispensing at least one effluent mixture comprising:
   a dispenser inlet connectable to a pressurized liquid source;
   at least one actuated valve defining a diluent outlet in fluid communication with the dispenser inlet;
   at least one backflow preventer and eductor system in fluid communication with the at least one diluent outlet and defining at least one dispenser outlet for dispensing the at least one effluent mixture, the at least one eductor system defining at least one additive inlet in fluid communication with at least one respective additive source; and
   a plurality flow regulators, each flow regulator adapted to be interchangeably received by the at least one diluent outlet for selectively regulating a volumetric flow rate to each backflow preventer and eductor system, each flow regulator comprising a disc-like structure defining a plurality of through permeations, the permeations of each flow regulator defining the volumetric flow rate to each backflow preventer and eductor system.

2. The liquid dispenser of claim 1 wherein the at least one backflow preventer and eductor system is selected from a group consisting of air gap eductors and safe gap eductors.

3. The liquid dispenser of claim 2 wherein the permeations of the plurality of flow regulators respectively define volumetric flow rates of from about 1.4 gallons per minute to about 3.4 gallons per minute.

4. The liquid dispenser of claim 3 further comprising a standpipe adapted to be received by the at least one diluent outlet, the standpipe adapted to interchangeably receive the flow regulator therein to define a flow regulator and standpipe assembly, each flow regulator and standpipe assembly in fluid communication with each diluent outlet and backflow preventer and eductor system, each flow regulator and standpipe assembly located upstream of each backflow preventer and eductor system and downstream of each diluent outlet and defining a displacement distance from the flow regulator to an exit of the standpipe assembly, the displacement distance maintaining a laminar flow of a liquid from the flow regulator to the backflow prevention and eductor system.

5. The liquid dispenser of claim 4 wherein the displacement distance is from about 0.25 inches to about 1.5 inches.

6. The liquid dispenser of claim 5 wherein the displacement distance is about 0.9 inches.

7. The liquid dispenser of claim 5 wherein the displacement distance is about 0.5 inches.

8. A liquid dispenser for dispensing at least one effluent mixture comprising:
- a dispenser inlet connectable to a pressurized liquid source;
- at least two actuated valves defining respective diluent outlets in fluid communication with the dispenser inlet;
- at least two backflow preventer and eductor systems in respective fluid communication with the at least two diluent outlets and defining at least two dispenser outlets for dispensing the at least one effluent mixture, the at least two eductor systems each defining at least one additive inlet in fluid communication with at least one respective additive source; and
- a plurality of flow regulators, each flow regulator adapted to be interchangeably received by the at least two diluent outlets for selectively regulating a volumetric flow rate to each backflow preventer and eductor system, each flow regulator comprising a disc-like structure defining a plurality of through permeations, the permeations of each flow regulator defining the volumetric flow rate to each backflow preventer and eductor system.

9. The liquid dispenser of claim 8 wherein the at least two backflow preventer and eductor systems are selected from a group consisting of air gap eductors and safe gap eductors.

10. The liquid dispenser of claim 9 wherein the permeations of the plurality of flow regulators respectively define volumetric flow rates of from about 1.4 gallons per minute to about 3.4 gallons per minute.

11. The liquid dispenser of claim 10 wherein the permeations of at least two of the flow regulators define equal volumetric flow rates to the at least two backflow preventer and eductor systems.

12. The liquid dispenser of claim 10 wherein the permeations of at least two of the flow regulators define unequal volumetric flow rates to the at least two backflow preventer and eductor systems.

13. The liquid dispenser of claim 10 further comprising a standpipe adapted to be received by the at least two diluent outlets, the standpipe adapted to interchangeably receive the flow regulator therein to define a flow regulator and standpipe assembly, each flow regulator and standpipe assembly in fluid communication with each diluent outlet and backflow preventer and eductor system, each flow regulator and standpipe assembly located upstream of each backflow preventer and eductor system and downstream of each diluent outlet and defining a displacement distance from the flow regulator to an exit of the standpipe assembly, the displacement distance maintaining a laminar flow of a liquid from the flow regulator to the backflow prevention and eductor system.

14. The liquid dispenser of claim 13 wherein the permeations of at least two of the flow regulators define equal volumetric flow rates to the at least two backflow preventer and eductor systems.

15. The liquid dispenser of claim 13 wherein the permeations of at least two of the flow regulators define different volumetric flow rates to the at least two backflow preventer and eductor systems.

16. The liquid dispenser of claim 13 wherein the displacement distance is from about 0.25 inches to about 1.5 inches.

17. The liquid dispenser of claim 16 wherein the displacement distance is about 0.9 inches.

18. The liquid dispenser of claim 16 wherein the displacement distance is about 0.5 inches.

19. A liquid dispenser for dispensing an effluent mixture comprising:
- a dispenser inlet connectable to a pressurized liquid source;
- an actuated valve defining a diluent outlet in fluid communication with the dispenser inlet;
- an air-gap eductor in fluid communication with the diluent outlet and defining a dispenser outlet for dispensing the effluent mixture, the air-gap eductor defining an additive inlet in fluid communication with at least one additive source;
- a flow regulator adapted to be interchangeably received by the diluent outlet for selectively regulating a volumetric flow rate to the air-gap eductor, the flow regulator comprising a disc-like structure defining a plurality of through permeations, the permeations of the flow regulator defining a volumetric flow rate of about 1.4 gallons per minute; and
- a standpipe adapted to be received by the diluent outlet, the standpipe adapted to receive each of the flow regulators therein to define a flow regulator and standpipe assembly, the flow regulator and standpipe assembly in fluid communication with the diluent outlet and air-gap eductor, the flow regulator and standpipe assembly located upstream of the air-gap eductor and downstream of the diluent outlet and defining a displacement distance from the flow regulator to an exit of the standpipe assembly of about 0.9 inches, the displacement distance maintaining a laminar flow of a liquid from the flow regulator to the air-gap eductor.

20. A liquid dispenser for dispensing an effluent mixture comprising:
- a dispenser inlet connectable to a pressurized liquid source;
- a pair of actuated valves defining respective diluent outlets in fluid communication with the dispenser inlet;
- a pair of air-gap eductors in respective fluid communication with the diluent outlets and defining a pair of respective dispenser outlets for dispensing the effluent mixture, the air-gap eductors each defining an additive inlet in fluid communication with at least one additive source;
- a pair of flow regulators, each flow regulator adapted to be interchangeably, received by the respective diluent outlets for selectively regulating a volumetric flow rate to the respective air-gap eductors, each flow regulator comprising a disc-like structure defining a plurality of through permeations, the permeations of the pair of flow regulators defining respective volumetric flow rates of between about 1.4 gallons per minute and about 3.4 gallons per minute; and
- a pair of standpipes adapted to be respectively received by the diluent outlets, the standpipes respectively adapted to receive the flow regulators therein to define a pair of flow regulator and standpipe assemblies, the flow regulator and standpipe assemblies in respective fluid communication with the diluent outlets and air-gap eductors, the flow regulator and standpipe assemblies located upstream of the respective air-gap eductors and downstream of the respective diluent outlets, each assembly defining a displacement distance of about 0.9 inches from the flow regulator to an exit of the standpipe assembly, the displacement distance maintaining a laminar flow of a liquid from the respective flow regulators to the respective air-gap eductors.

21. A liquid dispenser for dispensing an effluent mixture comprising:
   a dispenser inlet connectable to a pressurized liquid source;
   a pair of actuated valves defining respective diluent outlets in fluid communication with the dispenser inlet;
   a pair of air-gap eductors in respective fluid communication with the diluent outlets and defining a pair of respective dispenser outlets for dispensing the effluent mixture, the air-gap eductors each defining an additive inlet in fluid communication with at least one additive source;
   a pair of flow regulators, each flow regulator adapted to be interchangeably, received by the respective diluent outlets for selectively regulating a volumetric flow rate to the respective air-gap eductors, each flow regulator comprising a disc-like structure defining a plurality of through permeations, the permeations of each flow regulator of the pair defining a volumetric flow rates of about 1.4 gallons per minute; and
   a pair of standpipes adapted to be respectively received by the diluent outlets, the standpipes respectively adapted to receive the flow regulators therein to define a pair of flow regulator and standpipe assemblies, the flow regulator and standpipe assemblies in respective fluid communication with the diluent outlets and air-gap eductors, the flow regulator and standpipe assemblies located upstream of the respective air-gap eductors and downstream of the respective diluent outlets, each assembly defining a displacement distance of about 0.9 inches from the flow regulator to an exit of the standpipe assembly, the displacement distance maintaining a laminar flow of a liquid from the respective flow regulators to the respective air-gap eductors.

22. A liquid dispenser for dispensing an effluent mixture comprising:
   a dispenser inlet connectable to a pressurized liquid source;
   a pair of actuated valves defining respective diluent outlets in fluid communication with the dispenser inlet;
   a pair of air-gap eductors in respective fluid communication with the diluent outlets and defining a pair of respective dispenser outlets for dispensing the effluent mixture, the air-gap eductors each defining an additive inlet in fluid communication with at least one additive source;
   a pair of flow regulators, each flow regulator adapted to be interchangeably received by the respective diluent outlets for selectively regulating a volumetric flow rate to the respective air-gap eductors, each flow regulator comprising disc-like structure defining a plurality of through permeations, the permeations of each flow regulator of the pair defining a volumetric flow rates of about 3.4 gallons per minute; and
   a pair of standpipes adapted to be respectively received by the diluent outlets, the standpipes respectively adapted to receive the flow regulators therein to define a pair of flow regulator and standpipe assemblies, the flow regulator and standpipe assemblies in respective fluid communication with the diluent outlets and air-gap eductors, the flow regulator and standpipe assemblies located upstream of the respective air-gap eductors and downstream of the respective diluent outlets, each assembly defining a displacement distance of about 0.9 inches from the flow regulator to an exit of the standpipe assembly, the displacement distance maintaining a laminar flow of a liquid from the respective flow regulators to the respective air-gap eductors.

* * * * *